(12) United States Patent
Tomura et al.

(10) Patent No.: US 6,225,022 B1
(45) Date of Patent: *May 1, 2001

(54) OPTICAL RECORDING MEDIUM AND RECORDING METHOD USING THE SAME

(75) Inventors: Tatsuya Tomura, Tokyo; Tsutomu Sato, Kanagawa; Noboru Sasa, Kanagawa; Yasunobu Ueno, Kanagawa; Yasuhiro Higashi, Kanagawa, all of (JP)

(73) Assignee: Ricoh Company, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/120,325

(22) Filed: Jul. 22, 1998

(30) Foreign Application Priority Data

Jul. 22, 1997 (JP) .................................................. 9-211277

(51) Int. Cl.$^7$ ....................................................... G11B 7/24
(52) U.S. Cl. ................ 430/270.16; 430/945; 430/273.1; 369/288
(58) Field of Search ............................ 430/270.16, 945, 430/270.15, 273.1; 369/288

(56) References Cited

U.S. PATENT DOCUMENTS

| 4,714,667 | 12/1987 | Sato et al. ............................. 430/945 |
| 4,735,839 | 4/1988 | Sato et al. ............................. 430/945 |
| 4,737,444 | 4/1988 | Satoh et al. ........................... 430/945 |
| 4,758,499 | 7/1988 | Abe et al. ............................. 430/964 |
| 4,767,693 | 8/1988 | Oba et al. ............................. 430/945 |
| 4,814,256 | * 3/1989 | Aldag et al. ..................... 430/270.16 |
| 4,891,305 | 1/1990 | Oba et al. ............................. 430/945 |

(List continued on next page.)

FOREIGN PATENT DOCUMENTS 9-169166   * 6/1997 (JP) .
9-309268   * 12/1997 (JP) .
10-000856  * 1/1998 (JP) .

* cited by examiner

Primary Examiner—Martin Angebranndt
(74) Attorney, Agent, or Firm—Oblon, Spivak, McClelland, Maier & Neustadt, P.C.

(57) ABSTRACT

An optical recording medium has a substrate and a recording layer formed thereon, the recording layer containing at least one compound represented by formula (I):

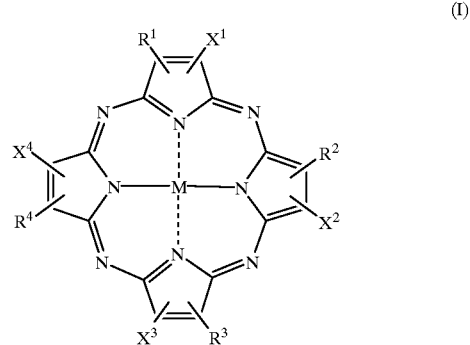

wherein M, $R^1$ to $R^4$ and $X^1$ to $X^4$ are as specified in the specification; and in addition, information can be recorded in the above-mentioned optical recording medium by applying a laser beam in a wavelength range of 630 to 720 nm thereto.

21 Claims, 2 Drawing Sheets

U.S. PATENT DOCUMENTS

| | | | |
|---|---|---|---|
| 5,002,812 | 3/1991 | Umehara et al. | 430/945 |
| 5,028,467 | 7/1991 | Maruyama et al. | 430/945 |
| 5,079,135 * | 1/1992 | Matsuzawa et al. | 430/270.16 |
| 5,085,909 | 2/1992 | Satoh et al. | 430/945 |
| 5,149,819 | 9/1992 | Satoh et al. | 548/149 |
| 5,256,794 | 10/1993 | Satoh et al. | 548/491 |
| 5,260,165 | 11/1993 | Satou et al. | 430/945 |
| 5,486,437 * | 1/1996 | Iwamura et al. | 430/270.16 |
| 5,510,229 | 4/1996 | Satoh et al. | 430/270.18 |
| 5,633,106 * | 5/1997 | Aihara et al. | 430/270.16 |
| 5,658,707 * | 8/1997 | Takuma et al. | 430/270.15 |
| 5,998,093 * | 12/1999 | Tomura et al. | 430/270.16 |

OPTICAL RECORDING MEDIUM AND RECORDING METHOD USING THE SAME

BACKGROUND OF THE INVENTION

1. Field of the Invention

The present invention relates to an optical recording medium, in particular to a write once optical recording medium capable of recording information therein and reproducing the recorded information therefrom by causing the optical characteristics, such as transmittance and reflectance, of a recording material for use in the optical recording medium to change by the application of an optical beam thereto. In addition, the present invention also relates to a method of recording information in the above-mentioned optical recording medium.

2. Discussion of Background

The wavelength of a laser beam used for currently employed write once optical disk systems of a write once read many type (WORM), and a compact disc-recordable (CD-R) type is in the range of 770 nm to 790 nm, and a recording medium for the write once optical disk system is designed in such a fashion that recording and reproduction can be performed in the above-mentioned wavelength range.

Sooner or later, it will be inevitable that the capacity of such a recording medium must be significantly increased in accordance with the amount of information to be handled. It is also inevitable that the wavelength of the laser beam used for the recording and reproduction will be shortened.

In recent years, there have been proposed many types of write once optical disks for data recording and reproduction, using a cyanine dye or a phthalocyanine dye as a recording material.

For example, the write once optical disks using as the recording material a cyanine dye are disclosed in Japanese Laid-Open Patent Applications 57-62093, 58-56892, 58-112790, 58-114989, 59-85791, 60-83236, 60-89842, and 61-25886. Furthermore, the write once optical disks using as the recording material a phthalocyanine dye are disclosed in Japanese Laid-Open Patent Applications 61-150243, 61-177287, 61-154888, 61-246091, 62-39286, 63-37791, and 63-39888.

However, there has not yet been developed any recording material that has high light resistance and excellent preservation stability, and is capable of performing the recording and reproducing operation using an optical pick-up of a laser beam with a wavelength of 700 nm or less.

The currently employed CD-R is also designed in such a fashion that recording and reproduction can be performed by a laser beam with a wavelength in the range of 770 nm to 790 nm.

In the case of the above-mentioned CD-R system, the increase in capacity of the recording medium also becomes inevitable, and there is the trend toward shortening of the wavelength of the laser beam to be used for data recording and reproduction.

In CDs and CD-ROMs which are currently employed, aluminum (Al) is coated on the concave and convex portions of the substrate therefor and the wavelength-dependence of the reflectance of Al is so small that even if the wavelength of the laser beam used therefor is shortened in the future, reproduction of information recorded in such CDs and CD-ROMs is possible.

In contrast to this, the recording layer of the currently employed CD-R, which contains therein a dye with a maximum absorption wavelength in the range of 680 nm to 750 nm, is designed so as to exhibit a maximum reflectance when a laser beam with a wavelength of 770 nm to 790 nm is applied thereto, with the optical characteristics and constants and the thickness and structure of the recording layer being taken into consideration. Therefore, when a laser beam with a wavelength of 700 nm or less is applied to the currently employed CD-R, the reflectance exhibited by the recording layer is extremely small, so that the currently employed CD-R cannot cope with the shortening of the wavelength of the employed laser beam in the future. As a result, it will be highly possible that the information recorded in the currently employed CD-R system cannot be reproduced therefrom by such a future system.

Many recording materials, for example, the combination of cyanine dye/metal reflection layer, phthalocyanine dye/metal reflection layer, and azo metal chelate dye/metal reflection layer, are proposed for the conventional CD-R. To be more specific, as the recording material for the CD-R, the combination of a cyanine dye/metal reflection layer is proposed in Japanese Laid-Open Patent Applications 1-159842, 2-42652, 2-13656, and 2-168446; a phthalocyanine dye as the recording material is proposed in Japanese Laid-Open Patent Applications 1-176585, 3-215466, 4-113886, 4-226390, 5-1272, 5-171052, 5-116456, 5-69860 and 5-139044; and an azo metal chelate dye as the recording material is proposed in Japanese Laid-Open Patent Applications 4-46186, 4-141489, 4-361088, and 5-279580.

However, there is no write once optical recording medium that can solve the above-mentioned problems.

SUMMARY OF THE INVENTION

It is therefore a first object of the present invention to provide an optical recording medium which has high light resistance and excellent preservation stability and can be used in a high density optical disk system which uses a semiconductor laser beam with a shorter wavelength than that of the laser beam currently employed in the conventional write once optical recording disk system.

Another object of the present invention is to provide an optical recording medium for the CD-R which is capable of performing the recording and reproduction by the currently employed CD-R disk system, and in addition, capable of performing the reproducing operation by a high density disk system for the next generation.

The above objects of the present invention can be achieved by an optical recording medium comprising a substrate and a recording layer formed on the substrate, the recording layer comprising at least a compound represented by formula (I):

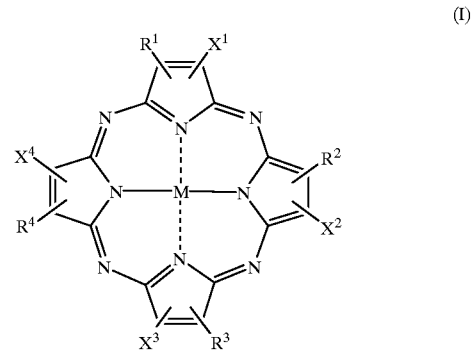

wherein M represents two independent hydrogen atoms, a bivalent, trivalent or tetravalent metal to which there may be bonded at least one oxygen atom or at least one halogen atom, or a bivalent, trivalent or tetravalent metal to which there may be bonded an unsubstituted or substituted alkyl group, an aryl group, an alkoxyl group, an aryloxy groups —(OPR$^{11}$R$^{12}$)$_t$ group, —(OPOR$^{13}$R$^{14}$)$_t$ group, —(OSiR$^{15}$R$^{16}$R$^{17}$)$_t$ group, —(OCOR$^{18}$)$_t$ group, —(OR$^{19}$)$_t$ group, —(OCOCOOR$^{20}$)$_t$ group, —(OCOCOR$^{21}$)$_t$ group, or —(OCONR$^{22}$R$^{23}$)$_t$ group;

in which R$^{11}$ to R$^{23}$ are each independently a hydrogen atom, a monovalent aliphatic hydrocarbon group which may have a substituent, or a monovalent aromatic hydrocarbon group which may have a substituent, and t is an integer of 0 to 2;

R$^1$ to R$^4$ are each independently a hydrogen atom or an alkyl group which may have a substituent; and X$^1$ to X$^4$ are each independently a phenyl group which may have a substituent.

In the formula (I), it is preferable that X$^1$ to X$^4$ be each independently a substituted phenyl group, with at least one of the substituents thereof being a halogen atom, more preferably, a fluorine atom, or a fluorine-atom containing group.

Alternatively, it is also preferable that in the formula (I), X$^1$ to X$^4$ be each independently a substituted phenyl group, with at least one of the substituents thereof being selected from the group consisting of an alkyl group and an alkoxyl group.

In addition, in the formula (I), it is preferable that R$^1$ to R$^4$ be each independently a branched alkyl group, or a substituted alkyl group having a halogen atom, more preferably, a fluorine atom, as the substituent thereof.

It is preferable that M in the formula (I) be selected from the group consisting of Cu, Co, Zn, Ni, Pd, Pt, VO, and Mg.

Furthermore, it is preferable that the recording layer of the optical recording medium further comprise at least one organic dye having a maximum absorption wavelength in the range of 680 nm to 750 nm, for example, a pentamethine cyanine dye, a phthalocyanine dye or an azo metal chelate dye.

Further, the optical recording medium may further comprise an undercoat layer which is provided between the substrate and the recording layer, a reflection layer which is provided on the recording layer, and a protective layer which is overlaid on the recording layer.

A third object of the present invention is to provide a recording method using the above-mentioned optical recording medium.

The above-mentioned object of the present invention can be achieved by a method of recording information, which comprises the step of applying a laser beam in a wavelength range of 630 to 720 nm to an optical recording medium which comprises a substrate, and a recording layer formed thereon, the recording layer comprising at least one compound represented by formula (I):

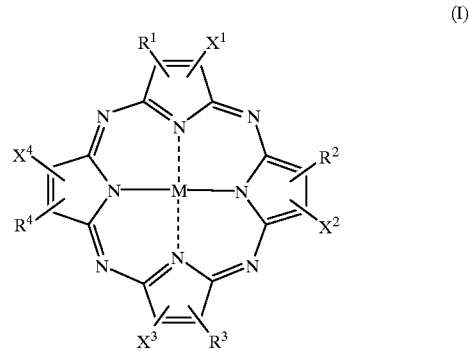

wherein M represents two independent hydrogen atoms, a bivalent, trivalent or tetravalent metal to which there may be bonded at least one oxygen atom or at least one halogen atom, or a bivalent, trivalent or tetravalent metal to which there may be bonded an unsubstituted or substituted alkyl group, an aryl group, an alkoxyl group, an aryloxy group, —(OPR$^{11}$R$^{12}$)$_t$ group, —(OPOR$^{13}$R$^{14}$)$_t$ group, —(OSiR$^{15}$R$^{16}$R$^{17}$)$_t$ group, —(OCOR$^{18}$)$_t$ group, —(OR$^{19}$)$_t$ group, —(OCOCOOR$^{20}$)$_t$ group, —(OCOCOR$^{21}$)$_t$ group, or —(OCONR$^{22}$R$^{23}$)$_t$ group;

in which R$^{11}$ to R$^{23}$ are each independently a hydrogen atom, a monovalent aliphatic hydrocarbon group which may have a substituent, or a monovalent aromatic hydrocarbon group which may have a substituent, and t is an integer of 0 to 2;

R$^1$ to R$^4$ are each independently a hydrogen atom or an alkyl group which may have a substituent; and X$^1$ to X$^4$ are each independently a phenyl group which may have a substituent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
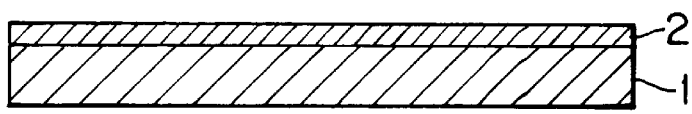
FIGS. 1A to 1D are schematic cross-sectional views which show examples of the optical recording medium according to the present invention as a WORM disk.

The recording layer of the optical recording medium according to the present invention comprises a compound represented by formula (I), so that the optical recording medium of the present invention is capable of performing the recording and reproducing operation using a semiconductor laser beam of 700 nm or less, and exhibits high light resistance and excellent preservation stability. Further, in the optical recording medium of the present invention, when the above-mentioned compound of formula (I) is used in combination with an organic dyestuff with a maximum absorption wavelength of 680 to 750 nm, which is employed as the recording material in the conventional CD-R, the obtained recording medium can be used as the CD-R in the current disc system, and further, information recorded in the optical recording medium can be reproduced using the high-density optical disk system using a semiconductor laser beam of 700 nm or less.

The compound of formula (I) for use in the recording layer of the optical recording medium according to the present invention is as follows:

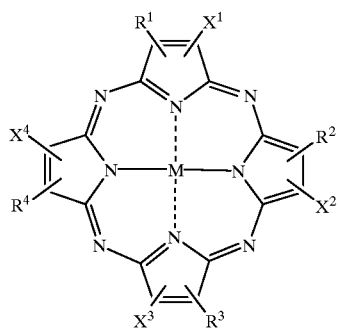

(I)

wherein M represents two independent hydrogen atoms, a bivalent, trivalent or tetravalent metal to which there may be bonded at least one oxygen atom or at least one halogen atom, or a bivalent, trivalent or tetravalent metal to which there may be bonded an unsubstituted or substituted alkyl group, an aryl group, an alkoxyl group, an aryloxy group, —(OPR$^{11}$R$^{12}$)$_t$ group, —(OPOR$^{13}$R$^{14}$)$_t$ group, —(OSiR$^{15}$R$^{16}$R$^{17}$)$_t$ group, —(OCOR$^{18}$)$_t$ group, —(OR$^{19}$)$_t$ group, —(OCOCOOR$^{20}$)$_t$ group, —(OCOCOR$^{21}$)$_t$ group, or —(OCONR$^{22}$R$^{23}$)$_t$ group;

in which R$^{11}$ to R$^{23}$ are each independently a hydrogen atom, a monovalent aliphatic hydrocarbon group which may have a substituent, or a monovalent aromatic hydrocarbon group which may have a substituent, and t is an integer of 0 to 2;

R$^1$ to R$^4$ are each independently a hydrogen atom or an alkyl group which may have a substituent; and X$^1$ to X$^4$ are each independently a phenyl group which may have a substituent.

There are the following four isomers (A), (B), (C) and (D) for the compound of formula (I):

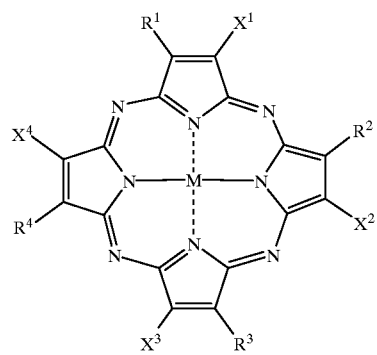

(A)

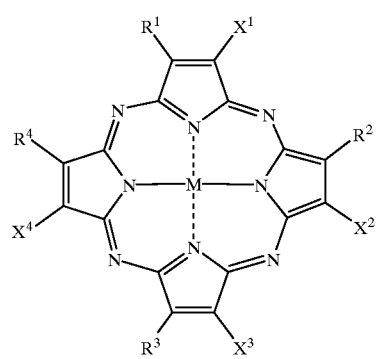

(B)

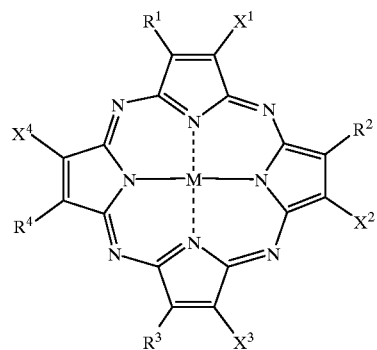

(C)

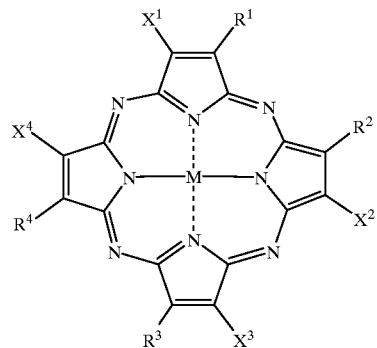

(D)

The recording layer comprising a mixture of the above-mentioned isomers (A) to (D) is advantageous because the absorption wavelength of the recording layer can be finely controlled and the margin for the recording power can be increased when the recording layer in the form of a thin film is prepared.

In the compound of formula (I), when $X^1$ to $X^4$ are each independently a substituted phenyl group which has a halogen atom as the substituent thereof, or $R^1$ to $R^4$ are each independently a substituted alkyl group which has a halogen atom as the substituent thereof, thermal decomposition of the obtained compound will take place abruptly. When such a compound is contained in the recording layer, the recording sensitivity is enhanced and a minute pit can be readily formed in the recording layer. As the substituent of the above-mentioned phenyl group represented by $X^1$ to $X^4$ or the above-mentioned alkyl group represented by $R^1$ to $R^4$, a halogen atom such as bromine atom, chlorine atom or fluorine atom is preferably employed, and in particular, a fluorine atom is more preferable in light of the solubility of the obtained compound.

Alternatively, the phenyl group represented by $X^1$ to $X^4$ may have a substituent such as a fluorine-atom containing group.

In this case, specific examples of the fluorine-atom containing group are as follows: trifluoromethyl group, trifluoroethyl group, difluoroethyl group, difluoropropyl group, trifluoropropyl group, tetrafluoropropyl group, hexafluorobutyl group, and a variety of perfluoroalkyl groups.

Examples of the substituent for the phenyl group represented by $X^1$ to $X^4$ include not only the previously mentioned halogen atom and fluorine-atom containing group, but also an alkyl group, an alkoxyl group, nitro group, and cyano group.

Specific examples of the alkyl group represented by $R^1$ to $R^4$ which has a fluorine atom as the substituent thereof include trifluoromethyl group, trifluoroethyl group, difluoroethyl group, difluoropropyl group, trifluoropropyl group, tetrafluoropropyl group, hexafluorobutyl group, and a variety of perfluoroalkyl groups. The alkyl group may have a substituent such as a chlorine atom or a bromine atom.

Examples of the alkyl group represented by $R^1$ to $R^4$ in formula (I) include straight-chain alkyl groups such as methyl group, ethyl group, n-propyl group, n-butyl group, n-pentyl group, n-hexyl group, n-heptyl group, n-octyl group, n-nonyl group, and n-decyl group; branched alkyl groups such as isobutyl group, isoamyl group, 2-methylbutyl group, 2-methylpentyl group, 3-methylpentyl group, 4-methylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-mothylpropyl group, 1-methylhexyl group, 1-ethylheptyl group, 1-propylbutyl group, 1-isopropyl-2-methylpropyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, 1-isobutyl-3-methylbutyl group, neopentyl group, tert-butyl group, tert-hexyl group, tert-amyl group, and tert-octyl group; and cycloalkyl groups such as cyclohexyl group, 4-methylcyclohexyl group, 4-ethylcyclohexyl group, 4-tert-butylcyclohexyl group, 4-(2-ethylhexyl)cyclohexyl group, bornyl group, isobornyl group and adamantane group.

Examples of the unsaturated alkyl group are ethylene group, propylene group, butylene group, hexene group, octene group, dodecene group, cyclohexene group and butyl hexene group.

It is preferable that the alkyl group represented by $R^1$ to $R^4$ in formula (I) be a branched alkyl group because association of molecules can be inhibited owing to a bulky branched alkyl group contained in each molecule. Therefore, the refractive index of the recording layer is increased, and the reflectance of the obtained recording medium is improved.

In formula (I), specific examples of M include metals such as Al, Si, Ca, Ti, V, Mn, Fe, Co, Ni, Cu, Zn, Ge, Mo, Ru, Rh, Pd, In, Sn, Pt, Pb and Mg; and a halide, an oxide and a hydroxide of the above-mentioned metals; and the above-mentioned metals to which an alkyl group, an alkoxyl group, an aryl group, an aryloxy group, or a silyloxy group is bonded.

In particular, it is preferable that M in the formula (I) be a metal selected from the group consisting of Cu, Co, Zn, Ni, Pd, Pt, VO, and Mg because the optical properties thereof are excellent, and the optical disc characteristics of the obtained recording medium are superior, and the recording medium can be obtained in high yield.

Specific examples of the monovalent aliphatic hydrocarbon group represented by $R^{11}$ to $R^{23}$ include alkyl groups such as methyl group, ethyl group, propyl group, isopropyl group, butyl group, isobutyl group, sec-butyl group, tert-butyl group, amyl group, hexyl groups, octyl group, decyl group, dodecyl group and octadecyl group, and alkenyl groups such as vinyl group, allyl group, isopropenyl group, 1-butenyl group, 2-butenyl group and 2-pentenyl group.

Specific examples of the monovalent aromatic hydrocarbon group represented by $R^{11}$ to $R^{23}$ include phenyl group and benzyl group.

Examples of the substituent for the above-mentioned monovalent aliphatic hydrocarbon group and aromatic hydrocarbon group are a halogen atom such as a fluorine atom, a chlorine atom or a bromine atom, a trifluorocarbon group, cyano group, and an ester group.

Specific examples of the compound represented by formula (I) are shown in TABLE 1.

In TABLE 1, isomers for each compound are not indicated, but the previously mentioned isomers (A) to (D) for each of the compounds No. 1 to No. 31 are available in practice.

TABLE 1

$$\text{(I)}$$

[Structure of macrocyclic complex with central metal M coordinated to four pyrrole-type nitrogens, with substituents R¹, R², R³, R⁴ and X¹, X², X³, X⁴ at the periphery]

| Comp. No. | M | X¹ | X² | X³ | X⁴ | R¹ | R² | R³ | R⁴ |
|---|---|---|---|---|---|---|---|---|---|
| 1 | Cu | 2-CF₃-C₆H₄ | 2-CF₃-C₆H₄ | 2-CF₃-C₆H₄ | 2-CF₃-C₆H₄ | C(CH₃)₃ | C(CH₃)₃ | C(CH₃)₃ | C(CH₃)₃ |
| 2 | Ni | 2-CH₃-C₆H₄ | 2-CH₃-C₆H₄ | 2-CH₃-C₆H₄ | 2-CH₃-C₆H₄ | C(CH₃)₃ | C(CH₃)₃ | C(CH₃)₃ | C(CH₃)₃ |
| 3 | Pt | 3,5-(CF₃)₂-C₆H₃ | 3,5-(CF₃)₂-C₆H₃ | 3,5-(CF₃)₂-C₆H₃ | 3,5-(CF₃)₂-C₆H₃ | CH(CH₃)₂ | CH(CH₃)₂ | CH(CH₃)₂ | CH(CH₃)₂ |

TABLE 1-continued
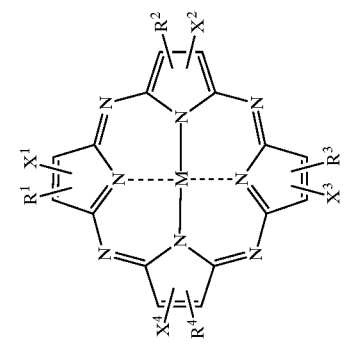
(I)
| Comp. No. | M | X¹ | X² | X³ | X⁴ | R¹ | R² | R³ | R⁴ |
|---|---|---|---|---|---|---|---|---|---|
| 4 | $Si(OCOC_4H_9)_2$ | 2,6-dimethylphenyl | 2,6-dimethylphenyl | 2,6-dimethylphenyl | 2,6-dimethylphenyl | H | H | H | H |
| 5 | Pd | 2-chloro-6-fluorophenyl | 2-chloro-6-fluorophenyl | 2-chloro-6-fluorophenyl | 2-chloro-6-fluorophenyl | $CH(CH_3)_2$ | $CH(CH_3)_2$ | $CH(CH_3)_2$ | $CH(CH_3)_2$ |
| 6 | VO | pentafluorophenyl | pentafluorophenyl | pentafluorophenyl | pentafluorophenyl | $CH_2C(CH_3)_3$ | $CH_2C(CH_3)_3$ | H | H |

TABLE 1-continued (I)

[Structure: macrocyclic complex with central metal M coordinated to four pyrrole-like N units, with substituents R¹,X¹ / R²,X² / R³,X³ / R⁴,X⁴ at the peripheral positions]

| Comp. No. | M | $X^1$ | $X^2$ | $X^3$ | $X^4$ | $R^1$ | $R^2$ | $R^3$ | $R^4$ |
|---|---|---|---|---|---|---|---|---|---|
| 7 | Si[OPO(Ph)₂]₂ | 3,5-di-tert-butylphenyl | 3,5-di-tert-butylphenyl | 3,5-di-tert-butylphenyl | 3,5-di-tert-butylphenyl | CH(CH₃)₂ | CH(CH₃)₂ | CH(CH₃)₂ | CH(CH₃)₂ |
| 8 | Cu | 2-CF₃-phenyl | 2-CF₃-phenyl | 2-CF₃-phenyl | 2-CF₃-phenyl | CH₃ | CH₃ | CH₃ | CH₃ |
| 9 | Pt | 4-tert-butylphenyl | 4-tert-butylphenyl | 4-tert-butylphenyl | 4-tert-butylphenyl | CH₃ | CH₃ | CH₃ | CH₃ |
| 10 | Si[OSi(C₆H₁₃)₃]₂ | 4-tert-butylphenyl | 4-tert-butylphenyl | 4-tert-butylphenyl | 4-tert-butylphenyl | CH₃ | CH₃ | CH₃ | CH₃ |

TABLE 1-continued
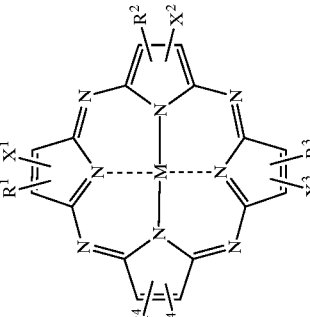
(I)
| Comp. No. | M | $X^1$ | $X^2$ | $X^3$ | $X^4$ | $R^1$ | $R^2$ | $R^3$ | $R^4$ |
|---|---|---|---|---|---|---|---|---|---|
| 11 | TiO | 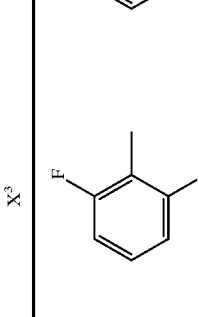 | 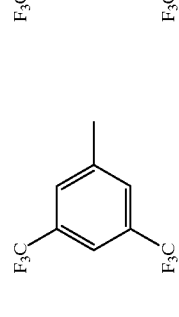 | 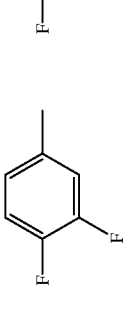 |  | $(CF_2)_2H$ | $(CF_2)_2H$ | $(CF_2)_2H$ | $(CF_2)_2H$ |
| 12 | Mg | 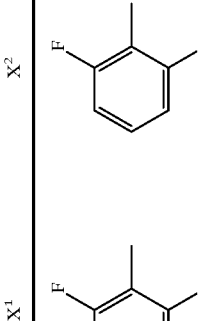 | 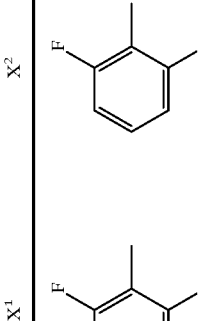 | 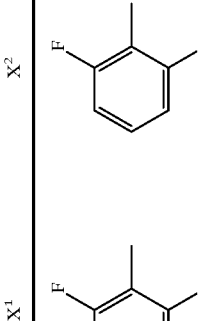 | 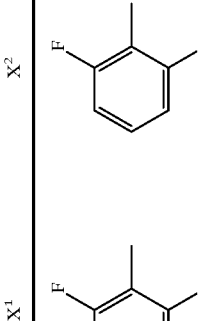 | $(CF_2)_2H$ | $(CF_2)_2H$ | $(CF_2)_2H$ | $(CF_2)_2H$ |
| 13 | Zn | 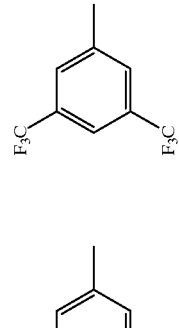 | 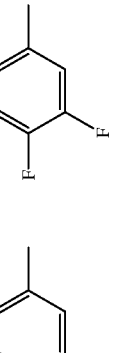 | 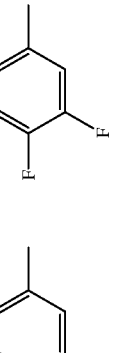 | 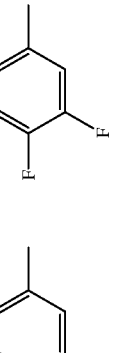 | $(CF_2)_4H$ | $(CF_2)_4H$ | $(CF_2)_4H$ | $(CF_2)_4H$ |

TABLE 1-continued (I)

[Structure of metal complex (I) with central metal M coordinated by four pyrrole nitrogens, bearing substituents R¹/X¹, R²/X², R³/X³, R⁴/X⁴ at the meso-adjacent positions]

| Comp. No. | M | X¹ | X² | X³ | X⁴ | R¹ | R² | R³ | R⁴ |
|---|---|---|---|---|---|---|---|---|---|
| 14 | VO | 2,6-difluorophenyl | 2,6-difluorophenyl | 2,6-difluorophenyl | 2,6-difluorophenyl | $(CF_2)_4H$ | $(CF_2)_4H$ | $(CF_2)_4H$ | $(CF_2)_4H$ |
| 15 | $SnCl_2$ | 2-($CF_3$)phenyl | 2-($CF_3$)phenyl | 2-($CF_3$)phenyl | 2-($CF_3$)phenyl | $C(CH_3)_3$ | $C(CH_3)_3$ | $C(CH_3)_3$ | $C(CH_3)_3$ |
| 16 | CO | 2-($OCH_2OC_2H_5$)phenyl | 2-($OCH_2OC_2H_5$)phenyl | 2-($OCH_2OC_2H_5$)phenyl | 2-($OCH_2OC_2H_5$)phenyl | $C(CH_3)_3$ | $C(CH_3)_3$ | $C(CH_3)_3$ | $C(CH_3)_3$ |
| 17 | Pd | 2-($CF_2CF_2CH_3$)phenyl | 2-($CF_2CF_2CH_3$)phenyl | 2-($CF_2CF_2CH_3$)phenyl | 2-($CF_2CF_2CH_3$)phenyl | $CHBrC(CH_3)_3$ | $CHBrC(CH_3)_3$ | $CHBrC(CH_3)_3$ | $CHBrC(CH_3)_3$ |

TABLE 1-continued
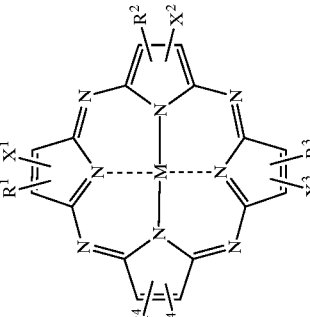
(I)
| Comp. No. | M | X$^1$ | X$^2$ | X$^3$ | X$^4$ | R$^1$ | R$^2$ | R$^3$ | R$^4$ |
|---|---|---|---|---|---|---|---|---|---|
| 18 | Cu | 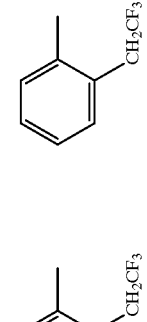 | 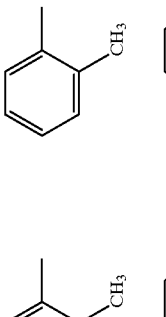 | 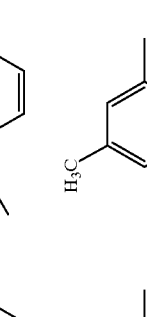 | 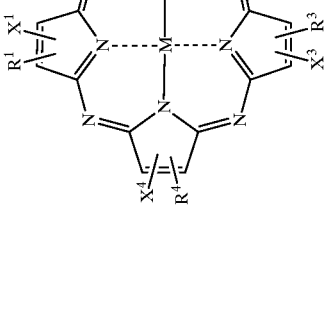 | C(CH$_3$)$_3$ | C(CH$_3$)$_3$ | C(CH$_3$)$_3$ | C(CH$_3$)$_3$ |
| 19 | Ni | 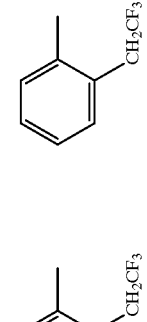 | 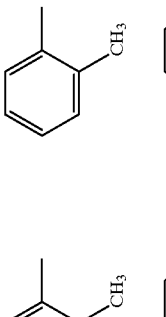 | 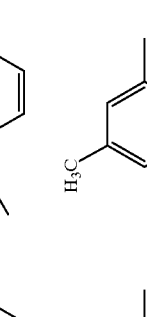 | 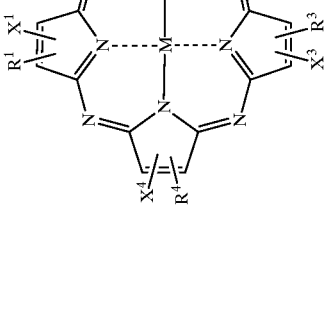 | CH(CH$_3$)$_2$ | CH(CH$_3$)$_2$ | CH(CH$_3$)$_2$ | CH(CH$_3$)$_2$ |
| 20 | VO | 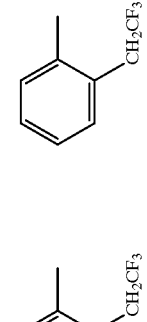 | 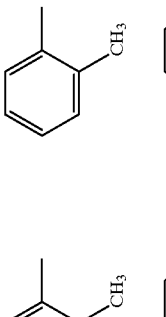 | 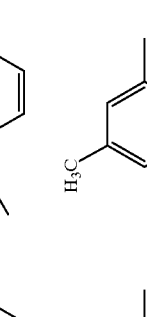 | 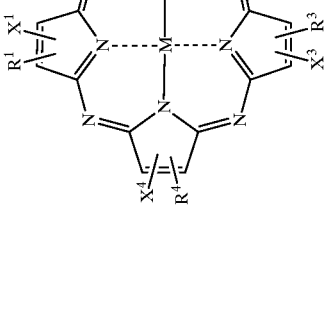 | CH(CH$_3$)$_2$ | CH(CH$_3$)$_2$ | CH(CH$_3$)$_2$ | CH(CH$_3$)$_2$ |
| 21 | TiO | 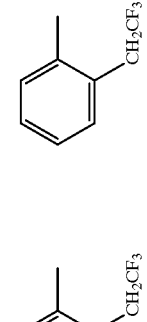 | 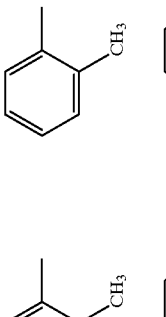 | 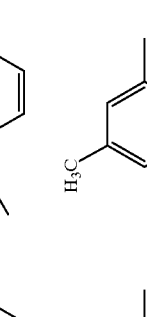 | | CH(CH$_3$)$_2$ | CH(CH$_3$)$_2$ | CH(CH$_3$)$_2$ | CH(CH$_3$)$_2$ |

TABLE 1-continued
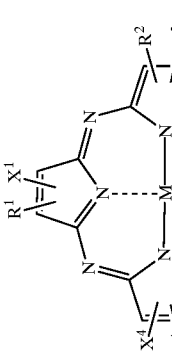
(I)
| Comp. No. | M | X¹ | X² | X³ | X⁴ | R¹ | R² | R³ | R⁴ |
|---|---|---|---|---|---|---|---|---|---|
| 22 | VO | 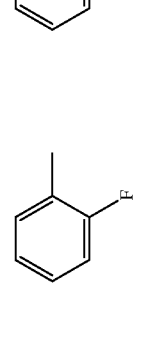 | 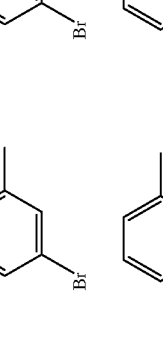 | 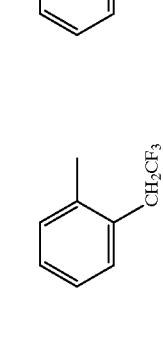 | 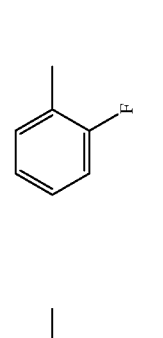 | C(CH$_3$)$_3$ | C(CH$_3$)$_3$ | C(CH$_3$)$_3$ | C(CH$_3$)$_3$ |
| 23 | Ni | 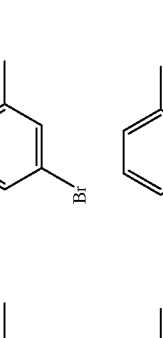 | 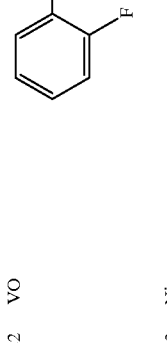 | 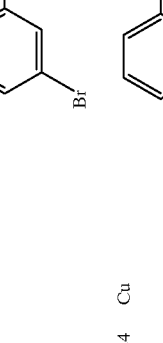 |  | CH(CH$_3$)$_2$ | CH(CH$_3$)$_2$ | CH(CH$_3$)$_2$ | CH(CH$_3$)$_2$ |
| 24 | Cu | 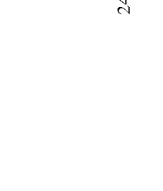 | | | | CH(CH$_3$)$_2$ | CH(CH$_3$)$_2$ | CH(CH$_3$)$_2$ | CH(CH$_3$)$_2$ |
| 25 | VO | | | | | C(CH$_3$)$_3$ | C(CH$_3$)$_3$ | C(CH$_3$)$_3$ | C(CH$_3$)$_3$ |

TABLE 1-continued (I)

| Comp. No. | M | X¹ | X² | X³ | X⁴ | R¹ | R² | R³ | R⁴ |
|---|---|---|---|---|---|---|---|---|---|
| 26 | Cu | 4-F-3-Me-C₆H₃-Br | 4-F-3-Me-C₆H₃-Br | 4-F-3-Me-C₆H₃-Br | 4-F-3-Me-C₆H₃-Br | $C(CH_3)_3$ | $C(CH_3)_3$ | $C(CH_3)_3$ | $C(CH_3)_3$ |
| 27 | Pd | 3-F-Me-C₆H₃ | 3-F-Me-C₆H₃ | 3-F-Me-C₆H₃ | 3-F-Me-C₆H₃ | $(CF_2)_6H$ | $(CF_2)_6H$ | $(CF_2)_6H$ | $(CF_2)_6H$ |
| 28 | Cu | 2,6-(CF₃)₂-Me-C₆H₃ | 2,6-(CF₃)₂-Me-C₆H₃ | 2,6-(CF₃)₂-Me-C₆H₃ | 2,6-(CF₃)₂-Me-C₆H₃ | $(CF_2)_6H$ | $(CF_2)_6H$ | $(CF_2)_6H$ | $(CF_2)_6H$ |

TABLE 1-continued $$\text{(I)}$$

| Comp. No. | M | X$^1$ | X$^2$ | X$^3$ | X$^4$ | R$^1$ | R$^2$ | R$^3$ | R$^4$ |
|---|---|---|---|---|---|---|---|---|---|
| 29 | AlCl | 2-methylphenyl | 2-methylphenyl | 2-methylphenyl | 2-methylphenyl | (CF$_2$)$_8$H | (CF$_2$)$_8$H | (CF$_2$)$_8$H | (CF$_2$)$_8$H |
| 30 | Co | 2-fluorophenyl | 2-fluorophenyl | 2-fluorophenyl | 2-fluorophenyl | (CF$_2$)$_8$H | (CF$_2$)$_8$H | (CF$_2$)$_8$H | (CF$_2$)$_8$H |
| 31 | Zn | 4-bromo-2-fluoro-5-methylphenyl | 4-bromo-2-fluoro-5-methylphenyl | 4-bromo-2-fluoro-5-methylphenyl | 4-bromo-2-fluoro-5-methylphenyl | (CF$_2$)$_{10}$H | (CF$_2$)$_{10}$H | (CF$_2$)$_{10}$H | (CF$_2$)$_{10}$H |

As mentioned above, by using the recording layer which comprises at least the compound of formula (I) and at least one organic dye having a maximum absorption wavelength in the range of 680 nm to 750 nm, there can be provided a recording medium which is not only capable of carrying out the recording and reproducing operation in the currently employed CD-R system, but also capable of carrying out the reproducing operation in the high density disk system for the next generation.

Preferable examples of such an organic dye having a maximum absorption wavelength in the range of 680 nm to 750 nm include a pentamethine cyanine dye, a phthalocyanine dye and an azo metal chelate dye.

With respect to the pentamethine cyanine dye, a pentamethine cyanine dye having the following formula (II) is preferably employed in the present invention:

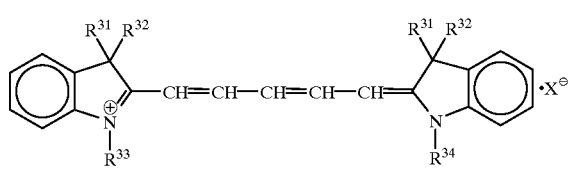

(II)

wherein $R^{31}$ and $R^{32}$ are each independently an alkyl group having 1 to 3 carbon atoms; $R^{33}$ and $R^{34}$ are each independently an unsubstituted or substituted alkyl group having 1 to 6 carbon atoms; X is an acid anion; and the aromatic ring may be condensed with other aromatic ring, and may have a substituent selected from the group consisting of an alkyl group, a halogen atom, an alkoxyl group, and an acyl group.

The following phthalocyanine dyes of formulas (III) and (IV) are preferably employed in the recording layer:

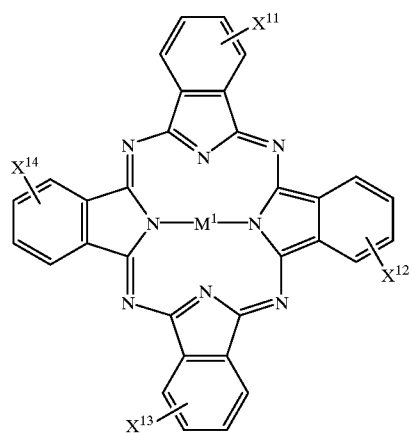

(III)

wherein $M^1$ is Ni, Pd, Cu, Zn, Co, Mn, Fe, TiO or VO; $X^{11}$ to $X^{14}$ are each independently —OR or —SR, in which R is an unsubstituted or substituted, straight-chain, branched or alicyclic alkyl group having 3 to 12 carbon atoms, or an unsubstituted or substituted aryl group, with $X^{11}$ to $X^{14}$ being substituted at α-position of each benzene ring bonded thereto, provided that each benzene ring may have as a substituent a hydrogen atom or a halogen atom except at the α-position for the substitution of $X^{11}$ to $X^{14}$.

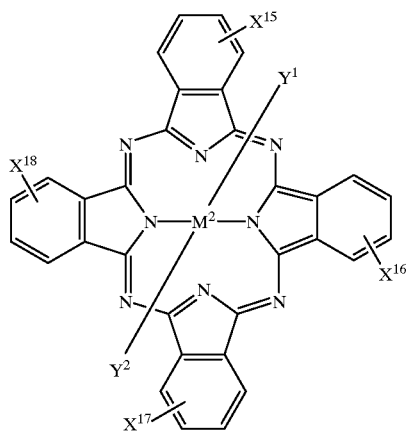

(IV)

wherein $M^2$ is Si, Ge, In or Sn; $X^{15}$ to $X^{18}$ are each independently —OR or —SR, in which R is an unsubstituted or substituted, straight-chain, branched or alicyclic alkyl group having 3 to 12 carbon atoms, or an unsubstituted or substituted aryl group, with $X^{15}$ to $X^{18}$ being substituted at α-position of each benzene ring bonded thereto, provided that each benzene ring may have as a substituent a hydrogen atom or a halogen atom except at the α-position for the substitution of $X^{15}$ to $X^{18}$ and $Y^1$ and $Y^2$ are each independently —$OSiR^{25}R^{26}R^{27}$, —$OCOR^{25}R^{26}R^{27}$ or —$OPOR^{25}R^{26}R^{27}$, in which $R^{25}$, $R^{26}$ and $R^{27}$ are each independently an alkyl group having 1 to 10 carbon atoms or an aryl group.

An azo metal chelate compound prepared from an azo compound of the following formula (V) and a metal is preferably employed in the present invention. In this case, preferable examples of the metal are Ni, Pt, Pd, Co, Cu and Zn.

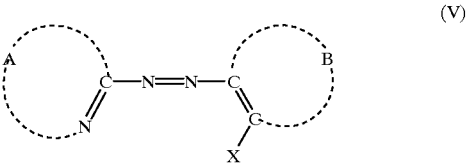

(V)

wherein A is a residue which is capable of forming a heterocyclic ring in combination with the carbon atom and the nitrogen atom to which A is bonded; B is a residue which is capable of forming an aromatic ring or a heterocyclic ring in combination with the two carbon atoms to which B is bonded; and X is a group having an active hydrogen atom.

When at least the compound of formula (I), and at least one organic dye selected from the above-mentioned pentamethine cyanine dye and phthalocyanine dye of formulas (II) to (IV) and the azo metal chelate dye prepared from the azo compound of formula (V) are both contained in the recording layer, it is preferable that the mixing ratio by weight of the compound of formula (I) to the one of the above-mentioned organic dyes of formulas (I) to (V) be in the range of 10:100 to 90:100, more preferably in the range of 40:100 to 20:100. It is preferable that the thus prepared recording layer have a thickness in the range of 500 Å to 5 μm, more preferably in the range of 1000 Å to 5000 Å.

FIGS. 1A to 1D show schematic cross-sectional views which show structural examples of an optical recording medium of the present invention, which can be used as a write once read many (WORM) type optical disk.

The recording medium of the present invention shown in FIG. 1A comprises a substrate 1 and a recording layer 2 which is provided on the substrate 1.

Figure 1B:
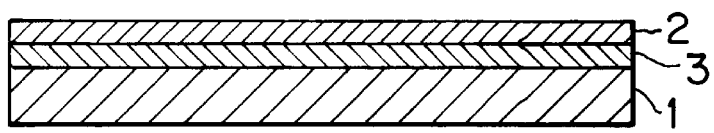

The recording medium of the present invention shown in FIG. 1B is the same as the recording medium shown in FIG. 1A except that an undercoat layer 3 is interposed between the substrate 1 and the recording layer 2.

Figure 1C:
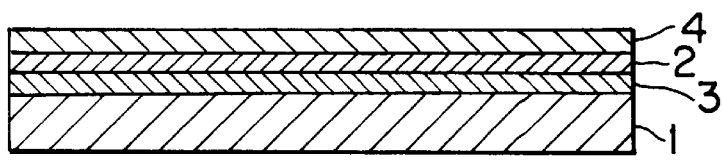

The recording medium of the present invention shown in FIG. 1C is the same as the recording medium shown in FIG. 1B except that a protective layer 4 is overlaid on the recording layer 2.

Figure 1D:
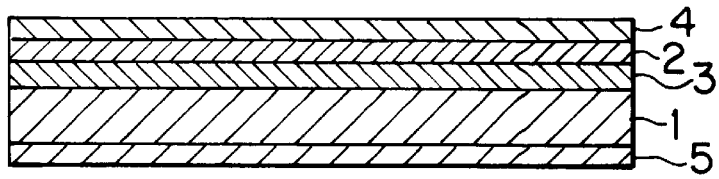

The recording medium of the present invention shown in FIG. 1D is the same as the recording medium shown in FIG. 1C except that a hard coat layer 5 is provided on the back side of the substrate 1, opposite to the side of the undercoat layer 3 with respect to the substrate 1.

Figure 2A:
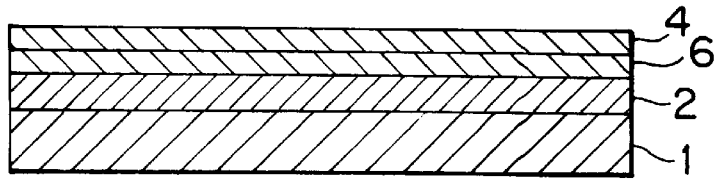
FIGS. 2A to 2C are schematic cross-sectional views which show another examples of the optical recording medium according to the present invention which is suitable for the CD-R.
Figure 2B:
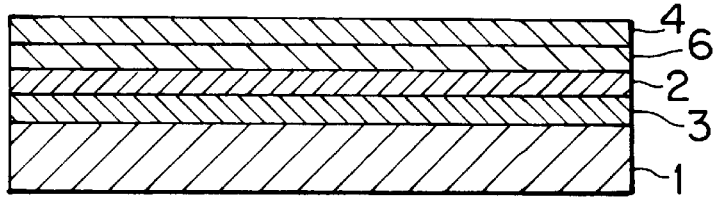
Figure 2C:
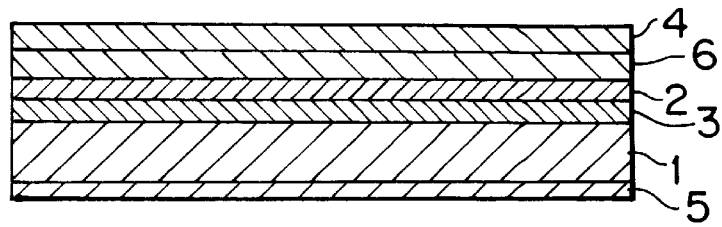

FIGS. 2A to 2C are schematic cross-sectional views showing the structure of an optical recording medium according to the present invention, which can be used as a recording medium for the CD-R.

The recording medium of the present invention shown in FIG. 2A comprises a substrate 1, and a recording layer 2, a reflection layer 6 and a protective layer 4 which are successively overlaid on the substrate 1.

The recording medium of the present invention shown in FIG. 2B is the same as the recording medium shown in FIG. 2A except that an undercoat layer 3 is interposed between the substrate 1 and the recording layer 2.

The recording medium of the present invention shown in FIG. 2C is the same as the recording medium shown in FIG. 2B except that a hard coat layer 5 is provided on the back side of the substrate 1, opposite to the side of the undercoat layer 3 with respect to the substrate 1.

Figure 3A:
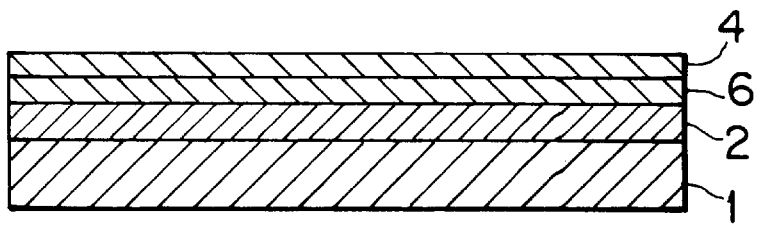
FIGS. 3A to 3C are schematic cross-sectional views which show further examples of the optical recording medium according to the present invention which is suitable for the DVD-R (digital video disc-recordable).
Figure 3B:
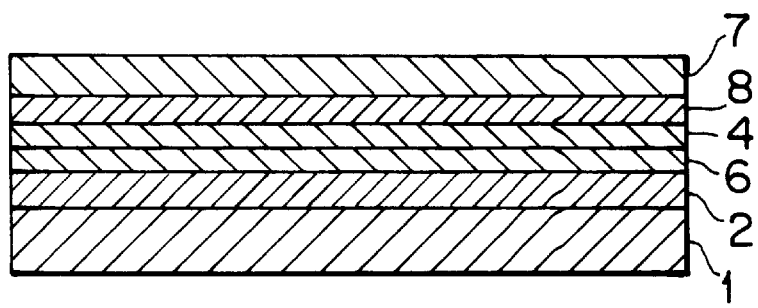
Figure 3C:
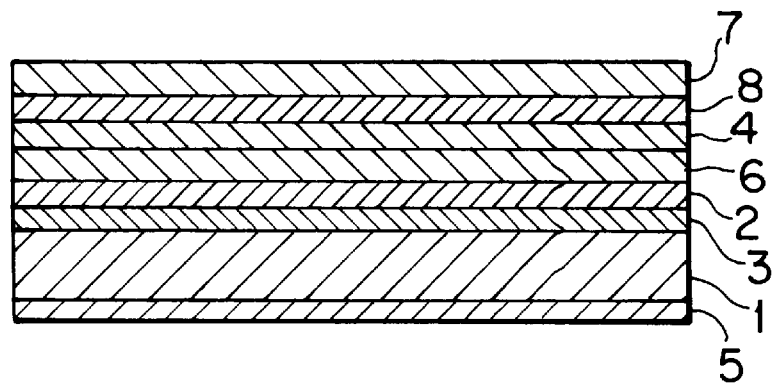

FIGS. 3A to 3C are schematic cross-sectional views showing the structure of the optical recording medium according to the present invention, which can be used as a recording medium for a DVD-R.

The recording medium shown in FIG. 3A is the same as that shown in FIG. 2A in terms of the structure.

The recording medium shown in FIG. 3B is the same as the recording medium shown in FIG. 2A except that a protective substrate 7 is attached to the protective layer 4 with an adhesive layer 8.

The recording medium shown in FIG. 3C is the same as the recording medium shown in FIG. 2C except that a protective substrate 7 is attached to the protective layer 4 with an adhesive layer 8.

An optical recording medium of the present invention can also be constructed by superimposing any two of the above-mentioned recording media in such a manner that the recording layers of the two recording media are positioned inside so as to face each other with an air gap therebetween in a sealed air-sandwich structure, or by laminating the two recording media in the above-mentioned posture, but through the protective layer.

Required properties or characteristics and materials for each of the above-mentioned layers of the optical recording medium of the present invention will now be explained.
(1) Substrate When recording and reproduction are carried out at the substrate side, it is required that the substrate be transparent to the laser beam employed for the recording and reproduction. However, such transparency is unnecessary when recording and reproduction are carried out at the recording layer side.

Examples of the material for the substrate are plastics such as polyester, acrylic resin, polyamide, polycarbonate resin, polyolefin resin, phenolic resin, epoxy resin and polyimide; glass; ceramics; and metals. A guide groove or guide pit for tracking may be formed on the surface of the substrate. Furthermore, preformats for address signals and the like may also be formed on the surface of the substrate.
(2) Recording Layer Information is recorded in the recording layer in such a manner that some optical changes are caused in the recording layer by the application of a laser beam thereto. According to the present invention, the recording layer comprises the compound of formula (I), optionally in combination with at least one organic dye selected from the organic dyes of formulas (II) to (IV) and the dye prepared from the azo compound of formula (V). Further, these dyes can also be used in combination with other organic pigments, metals or metal compounds in the form of a mixture or the form of laminated layers, in order to improve the optical characteristics, recording sensitivity and signal characteristics of the recording layer.

Examples of the above-mentioned other organic pigments are polymethine dyes, naphthalocyanine dyes, squarylium dyes, croconium dyes, pyrylium dyes, naphthoquinone dyes, anthraquinone (indanthrene) dyes, xanthene dyes, triphenylmethane dyes, azulene dyes, tetrahydrocholine dyes, phenanthrene dyes, triphenothiazine dyes, and metal complex compounds.

Examples of the above-mentioned metals and metal compounds for use in the recording layer are In, Te, Bi, Se, Sb, Ge, Sn, Al, Be, As, Cd, $TeO_2$ and SnO. These metals and metal compounds may be dispersed in combination with the above-mentioned dyes in the recording layer, or prepared into a layer of the metal or metal compound.

Further, various materials, for example, polymers such as ionomer resin, polyamide resin, vinyl resin, natural polymer, silicone, and liquid rubber, or a silane coupling agent may be dispersed in combination with the previously mentioned dyes.

In addition, to improve the characteristics of the recording layer, the recording layer may further comprise a stabilizer (for example, a transition metal complex), a dispersant, a fire retardant, a lubricant, an antistatic agent, a surfactant, and a plasticizer.

The recording layer can be formed by any of the conventional methods such as deposition, sputtering, chemical vapor deposition (CVD) and solvent coating.

When the coating method is employed for the formation of the recording layer, the above-mentioned compound of formula (I), optionally in combination with the organic dyes and other materials, may be dissolved in an organic solvent to prepare a coating liquid, and the coating liquid for the recording layer thus prepared may be coated, for instance, on the substrate by the conventional coating method such as spray coating, roller coating, dip coating, or spinner coating.

Specific examples of the organic solvent used for the preparation of the coating liquid for the recording layer include alcohols such as methanol, ethanol and isopropanol; ketones such as acetone, methyl ethyl ketone and cyclohexanone; amides such as N,N-dimethylacetamide and N,N-dimethylformamide; sulfoxide such as dimethylsulfoxide; ethers such as tetrahydrofuran, dioxane, diethyl ether and ethylene glycol monomethyl ether; esters such as methyl acetate and ethyl acetate; aliphatic carbon halides such as chloroform, methylene chloride, dichloroethane, carbon tetrachloride and trichloroethane; aromatic compounds such as benzene, xylene, monochlorobenzene and dichlorobenzene;

cellosolves such as methoxyethanol and ethoxyethanol; and hydrocarbons such as hexane, pentane, cyclohexane and methylcyclohexane.

It is preferable that the recording layer have a thickness in the range of 100 Å to 10 μm, more preferably in the range of 200 Å to 2000 Å.

(3) Undercoat Layer

The undercoat layer is interposed between the substrate and the recording layer for the following purposes: (a) improving the adhesion between the substrate and the recording layer; (b) preventing the recording layer from being exposed to water and gases as a barrier layer; (c) improving the preservation stability of the recording layer; (d) increasing the reflectance of the recording layer; (e) protecting the substrate from the solvent employed; and (f) forming guide grooves, guide pits and pregrooves and the like.

To attain the above-mentioned purpose (a), a variety of polymeric materials such as ionomer resin, polyamide resin, vinyl resin, natural resins, natural polymeric materials, silicone and liquid rubber; and a silane coupling agent may be employed.

To attain the purposes (b) and (c), inorganic compounds such as $SiO_2$, $MgF_2$, SiO, $TiO_2$, ZnO, TiN and SiN; and metals such as Zn, Cu, Ni, Cr, Ge, Se, Au, Ag and Al and semimetals can be used in addition to the above-mentioned polymeric materials.

To attain the purpose (d), a metal such as Al, Au or Ag may be used for the formation of the undercoat layer; or an organic thin film exhibiting metallic luster may be formed by using, for example, methine dye or xanthene dye.

To attain the purposes (e) and (f), an ultraviolet-curing resin, a thermosetting resin and a thermoplastic resin can be used for the formation of the undercoat layer.

It is preferable that the undercoat layer have a thickness in the range of 0.01 to 30 μm, more preferably in the range of 0.05 to 10 μm.

The undercoat layer may further comprise auxiliary agents such as a stabilizer, a dispersant, a fire retardant, a lubricant, an antistatic agent, a surfactant, and a plasticizer.

(4) Reflection Layer

The reflection layer for use in the present invention may be made of a metal or a semimetal which exhibits high reflectance by itself and is insusceptible to corrosion.

Specific examples of the metal for use in the reflection layer are Au, Ag, Al, Cr, Ni, Fe and Sn. Of these metals, Au, Ag and Al are particularly preferable in view of the reflectance and the productivity. These metals and semimetals may be used alone, or in combination to prepare an alloy.

The reflection layer can be formed by the conventional film formation method such as vacuum deposition or sputtering. It is preferable that the reflection layer have a thickness in the range of 50 to 5000 Å, more preferably in the range of 100 to 3000 Å.

(5) Protective Layer and Hard Coat Layer

The protective layer is provided on the recording layer, and the hard coat layer is provided on the back side of the substrate, opposite to the recording layer side with respect to the substrate. The protective layer serves to (a) protect the recording layer (or the reflection layer) from damage, dust, and soiling, (b) improve the storage stability of the recording layer (or the reflection layer), and (c) improve the reflectance. The hard coat layer is provided to protect the rear surface of the substrate from damage, dust, and soiling. For these purposes, the same materials as used for the undercoat layer are available in the preparation of the protective layer and the hard coat layer.

For instance, specific examples of the material for the protective layer and the hard coat layer include inorganic materials, such as SiO and $SiO_2$; and organic materials, such as heat-softening and heat-fusible resins, e.g. polymethyl acrylate, polycarbonate, epoxy resin, polystyrene, polyester resin, vinyl resin, cellulose, aliphatic hydrocarbon resin, natural rubber, styrene-butadiene resin, chloroprene rubber, wax, alkyd resin, drying oil and rosin, and ultraviolet-curing resins.

Of the above-mentioned resins, the ultraviolet-curing resin is most preferable for the formation of the protective layer and also for the hard coat layer, since the ultraviolet-curing resin is excellent in productivity.

It is proper that the protective layer or the hard coat layer have a thickness in the range of 0.01 to 30 μm, more preferably in the range of 0.05 to 10 μm.

The protective layer and the hard coat layer may further comprise auxiliary agents such as a stabilizer, a dispersant, a fire retardant, a lubricant, an antistatic agent, a surfactant, and a plasticizer.

(6) Protective Substrate

The protective substrate is required to be transparent with respect to the lease beam to be employed when the laser beam is applied to the protective substrate side of the recording medium. On the other hand, when the protective substrate just serves as a protective layer, it doesn't matter whether the protective substrate is transparent or not.

The same materials as those for the substrate are usable. For example, plastics such as polyester, acrylic resin, polyamide, polycarbonate resin, polyolefin resin, phenolic resin, epoxy resin, and polyimide; glass; ceramics; and metals can be used as the materials for the protective substrate.

(7) Adhesive Layer

The adhesive layer serves to attach the protective substrate to, for example, the protective layer. Any adhesive that can laminate the two recording media is usable. In view of the productivity, an ultraviolet-curing adhesive or a hot-melt adhesive are preferably employed for the formation of the adhesive layer.

Other features of this invention will become apparent in the course of the following description of exemplary embodiments, which are given for illustration of the invention and are not intended to be limiting thereof.

EXAMPLE 1

[Fabrication of Optical Recording Medium No. 1]

A guide groove with a depth of 1200 Å, a half width of 0.35 μm and a track pitch of 1.0 μm was formed on a photopolymer which was provided on one surface of a polymethyl methacrylate disk with a thickness of 1.2 mm, whereby a guide groove was provided on a substrate.

Compound No. 24 shown in TABLE 1 was dissolved in 1,2-dichloroethane, and the thus obtained solution of the compound No. 24 was applied to the above prepared substrate by spinner coating, whereby a recording layer with a thickness of 900 Å was provided on the substrate.

Thus, an optical recording medium No. 1 according to the present invention was fabricated.

EXAMPLES 2 TO 8

[Fabrication of Optical Recording Media Nos. 2 to 8]

The procedure for fabrication of the optical recording medium No. 1 in Example 1 was repeated except that the compound No. 24 for use in the coating liquid for the recording layer employed in Example 1 was replaced by compounds No. 4, No. 9, No. 16, No. 19, No. 20, No. 21, and No. 29 shown in TABLE 1, respectively in Examples 2 to 8.

Thus, optical recording media Nos. 2 to 8 according to the present invention were fabricated.

Comparative Example 1

[Fabrication of Comparative Optical Recording Medium No. 1]

The procedure for fabrication of the optical recording medium No. 1 in Example 1 was repeated except that the compound No. 24 for use in the coating liquid for the recording layer employed in Example 1 was replaced by the following compound of formula (VI), whereby a comparative optical recording medium No. 1 was fabricated.

(VI)

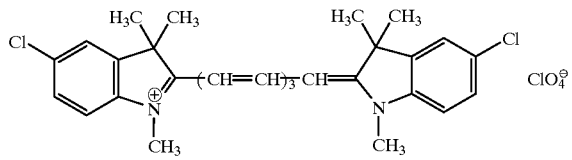

To evaluate the recording characteristics of each of the above prepared optical recording media Nos. 1 to 8 according to the present invention and comparative optical recording medium No. 1, information was recorded by applying a laser beam with a wavelength of 635 nm to the substrate side of each recording medium, under the conditions that the recording frequency was 1.25 MHZ, and the recording linear speed was 1.2 m/sec.

Using the same laser as employed in the above, a continuous wave laser beam having a reproduction power of 0.25 to 0.3 mW was applied to each recording medium to reproduce the recorded information, and the light reflected from the information-recorded position was detected. The detected light was subjected to a spectral analysis, using a scanning filter at a band width of 30 kHz, so that the initial C/N (carrier/noise) ratio was obtained. At the same time, the reflectance was measured at the position corresponding to the high level portion when the reproduction light was applied to the recording medium.

The results are shown in TABLE 2.

Each recording medium was caused to deteriorate by continuously exposing it to the light of a xenon lamp of 40,000 lux for 20 hours. After the light exposure, the reflectance and the C/N ratio of each recording medium were measured in the same manner as in the above. The results are also shown in TABLE 2.

Each recording medium was caused to deteriorate by allowing it to stand at 85° C. and 85% RH for 720 hours, and thereafter, the reflectance and the C/N ratio of each recording medium were measured in the same manner as in the above. The results are also shown in TABLE 2.

EXAMPLE 9

[Fabrication of Optical Recording Medium No. 9]

A guide groove with a depth of 1000 Å, a half width of 0.35 μm and a track pitch of 1.0 μm was formed on a polycarbonate disk with a thickness of 0.6 mm by injection molding, whereby a guide groove was provided on a substrate.

Compound No. 1 shown in TABLE 1 was dissolved in a mixed solvent of methylcyclohexane, 2-methoxyethanol, methyl ethyl ketone and tetrahydrofuran, and the thus obtained solution of the compound No. 1 was applied to the above prepared substrate by spinner coating, whereby a recording layer with a thickness of 1800 Å was provided on the substrate.

On the thus provided recording layer, a reflection layer of Au with a thickness of 2000 Å was provided by sputtering.

A protective layer made of an acrylic photopolymer with a thickness of 5 μm was formed on the reflection layer.

Further, a polycarbonate substrate with a thickness of 0.6 mm was attached to the above prepared protective layer with a hot-melt adhesive.

Thus, an optical recording medium No. 9 according to the present intention was fabricated.

EXAMPLE 10 TO 16

[Fabrication of Optical Recording Media Nos. 10 to 16]

The procedure for fabrication of the optical recording medium No. 9 in Example 9 was repeated except that the compound No. 1 for use in the coating liquid for the recording layer employed in Example 9 was replaced by compounds No. 2, No. 5, No. 14 No. 17, No. 20, No. 22 and No. 28 shown in TABLE 1, respectively in Examples 10 to 16.

Thus, optical recording media Nos. 10 to 16 according to the present invention were fabricated.

Comparative Example 2

[Fabrication of Comparative Optical Recording Medium No. 2]

The procedure for fabrication of the optical recording medium No. 9 in Example 9 was repeated except that the compound No. 1 for use in the coating liquid for the recording layer employed in Example 9 was replaced by the compound of formula (VI) employed in Comparative Example 1, whereby a comparative optical recording medium No. 2 was fabricated.

TABLE 2

|  | | Initial Stage | | After Light Exposure | | After Storage (85° C., 85% RH) | |
| --- | --- | --- | --- | --- | --- | --- | --- |
|  | Compound No. | Reflectance (%) | C/N ratio (dB) | Reflectance (%) | C/N ratio (dB) | Reflectance (%) | C/N ratio (dB) |
| Ex. 1 | 24 | 27 | 53 | 26 | 52 | 24 | 51 |
| Ex. 2 | 4 | 27 | 53 | 26 | 52 | 25 | 51 |
| Ex. 3 | 9 | 27 | 51 | 24 | 50 | 25 | 50 |
| Ex. 4 | 16 | 26 | 52 | 24 | 52 | 24 | 51 |
| Ex. 5 | 19 | 26 | 52 | 25 | 51 | 25 | 51 |
| Ex. 6 | 20 | 27 | 53 | 25 | 52 | 25 | 51 |
| Ex. 7 | 21 | 26 | 51 | 26 | 51 | 25 | 50 |
| Ex. 8 | 29 | 26 | 51 | 25 | 51 | 25 | 51 |
| Comp. Ex. 1 | (VI) | 14 | — (Note) | 8 | — (Note) | 9 | — (Note) |

Note: "—" denotes that the measurement was impossible.

Comparative Example 3
[Fabrication of Comparative Optical Recording Medium No. 3]

The procedure for fabrication of the optical recording medium No. 9 in Example 9 was repeated except that the compound No. 1 for use in the coating liquid for the recording layer employed in Example 9 was replaced by the following compound of formula (VII).

reproduction waveform obtained from each recording medium was inspected in the same manner as mentioned above. Furthermore, after the light exposure, the reflectance of each recording medium was measured in the same manner as mentioned above.

The results are also shown in TABLE 3.

TABLE 3

| Example No. | Compound No. | Initial Stage | | After Exposure to Xe lamp for 20 hrs. | |
|---|---|---|---|---|---|
| | | Reflectance (%) | Reproduction Waveform | Reflectance (%) | Reproduction Waveform |
| 9 | 1 | 72 | ○ | 72 | ○ |
| 10 | 2 | 72 | ○ | 71 | ○ |
| 11 | 5 | 72 | ○ | 71 | ○ |
| 12 | 14 | 72 | ○ | 71 | ○ |
| 13 | 17 | 71 | ○ | 71 | ○ |
| 14 | 20 | 72 | ○ | 71 | ○ |
| 15 | 22 | 71 | ○ | 70 | ○ |
| 16 | 28 | 70 | ○ | 70 | ○ |
| Comp. Ex. 2 | (VI) | 5 | — | 5 | — |
| Comp. Ex. 3 | (VII) | 15 | X | 5 | — |

Note: "○" denotes that the reproduction waveform was clear.
"X" denotes that the reproduction waveform was deformed.
"—" denotes that the measurement was impossible.

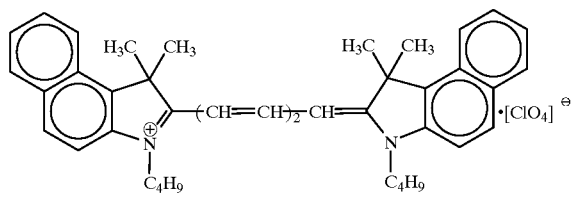

(VII)

Thus, a comparative optical recording medium No. 3 was fabricated.

To evaluate the recording characteristics of each of the above prepared optical recording media Nos. 9 to 16 according to the present invention and comparative optical recording media Nos. 2 and 3, EFM signals were recorded in each recording medium by applying a semiconductor laser beam with a wavelength of 635 nm and a beam diameter of 1.0 μm to each recording medium, while tracking was conducted, under the condition that the recording linear speed was set at 1.4 m/sec. Then, the recorded signals were reproduced using the same continuous wave laser beam and the reproduction waveform initially obtained from each recording medium was inspected.

At the same time, the reflectance was measured at the position corresponding to the high level portion when the reproduction light was applied to the recording medium.

The results are shown in TABLE 3.

Each recording medium was caused to deteriorate by continuously exposing it to the light of a xenon lamp of 40,000 lux for 20 hours. After the light exposure, the

EXAMPLE 17

[Fabrication of Optical Recording Medium No. 17]

A guide groove with a depth of 1000 Å, a half width of 0.40 μm and a track pitch of 1.1 μm was formed on a polycarbonate disk with a thickness of 0.6 mm by injection molding, whereby a guide groove was provided on a substrate.

The same compound represented by formula (VII) as employed in Comparative Example 3 and the compound No. 3 shown in TABLE 1 were mixed at a ratio by weight of 1:1, and the mixture of these compounds was dissolved in a mixed solvent of methylcyclohexane, 2-methoxyethanol, methyl ethyl ketone and tetrahydrofuran, and the thus obtained solution of the compound of formula (VII) and the compound No. 3 was applied to the above prepared substrate by spinner coatings whereby a recording layer with a thickness of 1600 Å was provided on the substrate.

On the thus provided recording layer, a reflection layer of Au with a thickness of 2100 Å was provided by sputtering.

A protective layer made of an acrylic photopolymer with a thickness of 7 μm was then formed on the reflection layer.

Thus, an optical recording medium No. 17 according to the present invention was fabricated.

EXAMPLES 18 AND 19

[Fabrication of Optical Recording Media Nos. 18 and 19]

The procedure for fabrication of the optical recording medium No. 17 in Example 17 was repeated except that the compound No. 3 for use in the coating liquid for the recording layer employed in Example 17 was replaced by compounds No. 5 and No. 6 shown in TABLE 1, respectively in Examples 18 and 19.

Thus, optical recording media Nos. 18 and 19 according to the present invention were fabricated.

EXAMPLES 20 AND 21

[Fabrication of Optical Recording Media Nos. 20 and 21]

The procedure for fabrication of the optical recording medium No. 17 in Example 17 was repeated except that the compound of formula (VII) for use in the coating liquid for the recording layer in Example 17 was replaced by the following compound of formula (VIII), and that the compound No. 3 for use in the coating liquid for the recording layer employed in Example 17 was replaced by compounds No. 8 and No. 18 shown in TABLE 1, respectively in Examples 20 and 21.

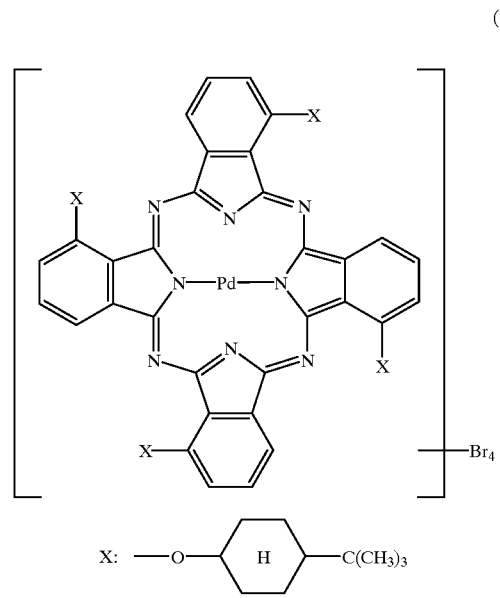

(VIII)

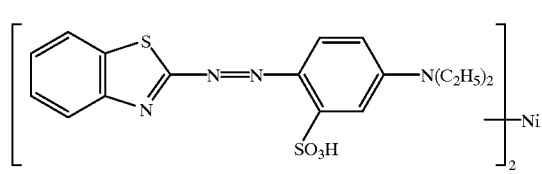

Thus, optical recording media Nos. 20 and 21 according to the present invention were fabricated.

EXAMPLES 22 AND 23

[Fabrication of Optical Recording Media Nos. 22 and 23]

The procedure for fabrication of the optical recording medium No. 17 in Example 17 was repeated except that the compound of formula (VII) for use in the coating liquid for the recording layer in Example 17 was replaced by the following compound of formula (IX), and that the compound No. 3 for use in the coating liquid for the recording layer employed in Example 17 was replaced by compounds No. 22 and No. 26 shown in TABLE 1, respectively in Examples 22 and 23.

(IX)

Thus, optical recording media Nos. 22 and 23 according to the present invention were fabricated.

Comparative Example 4

[Fabrication of Comparative Optical Recording Medium No. 41]

The procedure for fabrication of the optical recording medium No. 17 in Example 17 was repeated except that the compound No. 3 for use in the coating liquid for the recording layer in Example 17 was not employed, whereby a comparative optical recording medium No. 4 was fabricated.

Comparative Example 5

[Fabrication of Comparative Optical Recording Medium No. 5]

The procedure for fabrication of the optical recording medium No. 20 in Example 20 was repeated except that the compound No. 8 for use in the coating liquid for the recording layer in Example 20 was not employed, whereby a comparative optical recording medium No. 5 was fabricated.

Comparative Example 6

[Fabrication of Comparative Optical Recording Medium No. 6]

The procedure for fabrication of the optical recording medium No. 22 in Example 22 was repeated except that the compound No. 22 for use in the coating liquid for the recording layer in Example 22 was not employed, whereby a comparative optical recording medium No. 6 was fabricated.

To evaluate the recording characteristics of each of the above prepared optical recording media Nos. 17 to 23 according to the present invention and comparative optical recording media Nos. 4 to 6, EFM signals were recorded in each recording medium by applying a semiconductor laser beam with a wavelength of 780 nm and a beam diameter of 1.6 $\mu$m to each recording medium, while tracking was conducted, under the condition that the recording linear speed was set at 1.4 m/sec. Then, the recorded signals were reproduced, using the same laser beam with a wavelength of 780 nm as mentioned above, and also applying a continuous wave semiconductor laser beam with a wavelength of 635 nm and a beam diameter of 1.1 $\mu$/m to each recording medium. Thus, the two reproduction waveforms obtained from each recording medium were inspected.

At the same time, the reflectance was measured at the position corresponding to the high level portion when the reproduction light was applied to the recording medium.

The results are shown in TABLE 4.

TABLE 4

| Example No. | Compound No. | 780 nm Reflectance (%) | 780 nm Reproduction Waveform | 635 nm Reflectance (%) | 635 nm Reproduction Waveform |
|---|---|---|---|---|---|
| 17 | 3 & (VII) | 73 | ○ | 23 | ○ |
| 18 | 5 & (VII) | 72 | ○ | 23 | ○ |
| 19 | 6 & (VII) | 72 | ○ | 22 | ○ |
| 20 | 8 & (VIII) | 73 | ○ | 22 | ○ |
| 21 | 18 & (VIII) | 73 | ○ | 22 | ○ |
| 22 | 22 & (IX) | 72 | ○ | 21 | ○ |
| 23 | 26 & (IX) | 72 | ○ | 22 | ○ |
| Comp. Ex. 4 | (VII) | 75 | ○ | 5 | — |
| Comp. Ex. 5 | (VIII) | 74 | ○ | 5 | — |
| Comp. Ex. 6 | (IX) | 74 | ○ | 5 | — |

Note: "○" denotes that the reproduction waveform was clear.
"—" denotes that it was impossible to reproduce the recorded signals.

As previously explained, according to the present invention, there can be provided an optical recording medium which has excellent light resistance and preservation stability and can be subjected to recording and reproducing operation in a high density optical disk system employing a semiconductor laser beam with a wavelength of 700 nm or less because the compound of formula (I) for use in the recording layer exhibits high light absorption and reflection with respect to the light with a wavelength of 700 nm or less.

When, in the compound of formula (I), $X^1$ to $X^4$ are each a substituted phenyl group having a halogen atom as the substituent thererof, the recording sensitivity is improved with a jitter value being reduced.

Further, when the substituent for the phenyl group represented by $X^1$ to $X^4$ in the compound of formula (I) is a fluorine atom or a fluorine-atom containing group, the solubility of the obtained compound of formula (I) is improved. As a result, the productivity of the recording layer by coating method is effectively increased.

When, in the compound of formula (I), $X^1$ to $X^4$ are each a substituted phenyl group having an alkyl group or an alkoxyl group as the substituent thereof, association of molecules can be inhibited owing to a bulky alkyl group or alkoxyl group contained in each molecule. Therefore, the refractive index of the recording layer is increased, and the reflectance of the obtained recording medium is improved.

When, in the compound of formula (I), $R^1$ to $R^4$ are each a bulky branched alkyl group, the solubility of the compound of formula (I) becomes high and the association of molecules can be inhibited. Therefore, the refractive index of the recording layer is increased, and the reflectance of the obtained recording medium is improved.

When, in the compound of formula (I), $R^1$ to $R^4$ are each a substituted alkyl group having a halogen atom as the substituent thereof, the recording pit can be uniformly formed in the recording layer, and the recording medium can exhibit high sensitivity with the jitter value being reduced.

Further, when the substituent for the alkyl group represented by $R^1$ to $R^4$ in the compound of formula (I) is a fluorine atom or a fluorine-atom containing group, the solubility of the obtained compound of formula (I) is improved. As a result, the productivity of the recording layer by coating method is effectively increased, and the recording medium with a high sensitivity and a low jitter value can be provided.

When M in the compound of formula (I) is one selected from the group consisting of Cu, Co, Zn, Ni, Pd, Pt, VO and Mg, the productivity and the recording characteristics of the obtained recording medium are improved.

Furthermore, according to the present invention, when the recording layer comprises the compound of formula (I) and the organic dyestuff with a maximum absorption wavelength in the range of 680 to 750 nm, the obtained optical recording medium can be used as the CD-R in the currently employed disk system, and in addition, the obtained optical recording medium can be subjected to reproduction of recorded information in the high density disk system for the next generation.

By selecting the above-mentioned organic dyestuff having a maximum absorption wavelength in the range of 680 nm to 750 nm from the group consisting of a pentamethine cyanine dye, a phthalocyanine dye and an azo metal chelate dye, high quality signals can be recorded in the recording medium.

According to the recording method of the present invention, information can be recorded in the recording medium of the present invention by the application of a laser beam with a wavelength of 630 to 720 nm. Therefore, there can be provided a write once optical recording medium with a density of 1.6 to 1.8 times that of the optical recording medium designed so as to be compatible with the laser beam of 770 to 830 nm.

Japanese Patent Application No. 09-211277 filed Jul. 22, 1997 is hereby incorporated by reference.

What is claimed is:

1. Ann optical recording medium comprising a substrate, a recording layer formed thereon and a reflection layer which is overlaid on said recording layer, wherein said recording layer comprising at least one compound represented by formula (I),

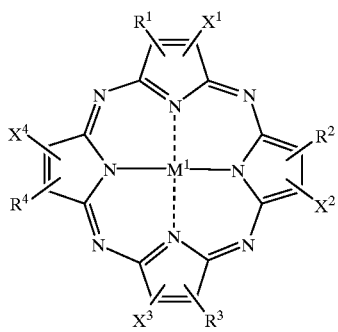

(I)

wherein M represents two independent hydrogen atoms, a bivalent, trivalent and tetravalent metal to which there may be bonded at least one oxygen atom or at least one halogen atom, or a bivalent, trivalent or tetravalent metal to which there may be bonded an unsubstituted or substituted alkyl group, an aryl group, an alkoxyl group, an aryloxy group —(OPR$^{11}$R$^{12}$)$_t$ group, —(OPOR$^{13}$R$^{14}$)$_t$ group, —(OSiR$^{15}$R$^{16}$R$^{17}$)$_t$ group, —(OCOR$^{18}$)$_t$ group, —(OR$^{19}$)$_t$ group, —(OCOCOOR$^{20}$)$_t$ group, —(OCOCOR$^{21}$)$_t$ group, or —(OCONR$^{22}$R$^{23}$)$_t$ group;

in which R$^{11}$ to R$^{23}$ are each independently a hydrogen atom, a monovalent aliphatic hydrocarbon group which may have a substituent, or a monovalent aromatic hydrocarbon group which may have a substituent, and t is an integer of 0 to 2;

R$^1$ to R$^4$ are each independently a hydrogen atom or an alkyl group which may have a substituent; and X$^1$ to X$^4$ are each independently a phenyl group substituted by alkyl, alkoxy, fluorine or a fluorine-atom containing group.

2. The optical recording medium as claimed in claim 1, wherein X$^1$ to X$^4$ in formula (I) are each independently a substituted phenyl group, with all the substituents thereof being fluorine.

3. The optical recording medium as claimed in claim 1, wherein X$^1$ to X$^4$ in formula (I) are each independently a substituted phenyl group, with all substituents thereof being fluorine-atom containing groups.

4. The optical recording medium as claimed in claim 1, wherein X$^1$ to X$^4$ in formula (I) are each independently a substituted phenyl group, with at least one of the substituents thereof being selected from the group consisting of an alkyl group and an alkoxyl group.

5. The optical recording medium as claimed in claim 1, wherein R$^1$ to R$^4$ in formula (I) are each independently a branched alkyl group.

6. The optical recording medium as claimed in claim 1, wherein R$^1$ to R$^4$ in formula (I) are each independently a substituted alkyl group, with at least one of the substituents thereof being a halogen atom.

7. The optical recording medium as claimed in claim 6, wherein said halogen atom is a fluorine atom.

8. The optical recording medium as claimed in claim 1, wherein M in formula (I) is one selected from the group consisting of Cu, Co, Zn, Ni, Pd, Pt, VO, and Mg.

9. The optical recording medium as claimed in claim 1, wherein said recording layer further comprises at least one organic dye having a maximum absorption wavelength in a range of 680 nm to 750 nm.

10. The optical recording medium as claimed in claim 9, wherein said organic dye is selected from the group consisting of a pentamethine cyanine dye, a phthalocyanine dye and an azo metal chelate dye.

11. The optical recording medium as claimed in claim 1, further comprising an undercoat layer which is provided between said substrate and said recording layer.

12. The optical recording medium as claimed in claim 1, further comprising a reflection layer which is overlaid on said recording layer.

13. The optical recording medium as claimed in claim 1, further comprising a protective layer which is overlaid on said recording layer.

14. The optical recording medium as claimed in claim 1, wherein said recording layer is formed by use of a coating liquid which is prepared by dissolving at least said one compound represented by formula (I) in at least one solvent selected from the group consisting of dichloroethane, methylcyclohexane, methoxyethanol, methyl ethyl ketone and tetrahydrofuran.

15. The optical recording medium as claimed in claim 14, wherein as said solvent used is dichloroethane.

16. The optical recording medium as claimed in claim 14, wherein as said solvents are used at least two of methylcyclohexane, methoxyethanol, methyl ethyl ketone or tetrahydrofuran in combination.

17. The optical recording medium as claimed in claim 1, wherein said recording layer further comprises at least one organic dye in combination with said compound represented by formula (I), said organic dye being selected from the group consisting of:

a pentamethine cyanine dye represented by formula (II):

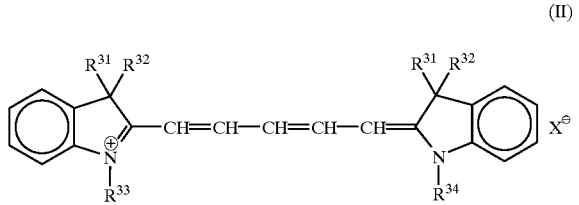

(II)

wherein R$^{31}$ and R$^{32}$ are each independently an alkyl group having 1 to 3 carbon atoms; R$^{33}$ and R$^{34}$ are each independently an unsubstituted or substituted alkyl group having 1 to 6 carbon atoms; X is an acid anion; and the aromatic ring may be condensed with other aromatic ring, and may have a substituent selected from the group consisting of an alkyl group, a halogen atom, an alkoxyl group, and an acyl group, a phthalocyanine dye represented by formula (III):

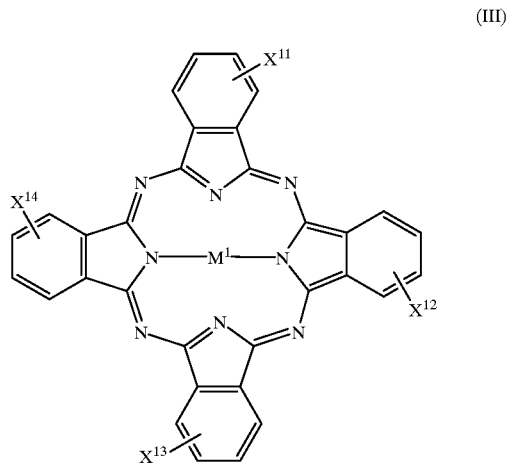

(III)

wherein M$^1$ is Ni, Pd, Cu, Zn, Co, Mn, Fe, TiO or VO; X$^{11}$ to X$^{14}$ are each independently —OR or —SR, in which R is an unsubstituted or substituted, straight-chain, branched or alicyclic alkyl group having 3 to 12 carbon atoms, or an unsubstituted or substituted aryl group, with $X^{11}$ to $X^{14}$ being substituted at α-position of each benzene ring bonded thereto, provided that each benzene ring may have as a substituent a hydrogen atom or a halogen atom except at the α-position for the substitution of $X^{11}$ to $X^{14}$, a phthalocyanine dye represented by formula (IV):

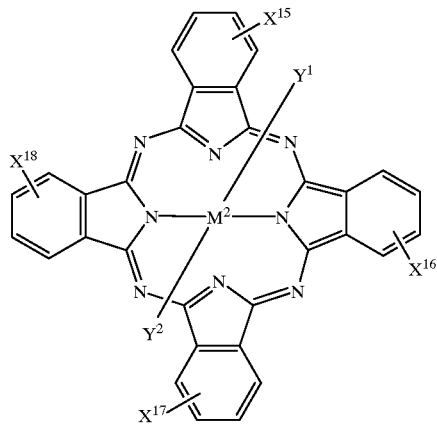

(IV)

wherein $M^1$ is Si, Ge, In or Sn; $X^{15}$ to $X^{18}$ are each independently —OR or —SR, in which R is an unsubstituted or substituted, straight-chain, branched or alicyclic alkyl group having 3 to 12 carbon atoms, or an unsubstituted or substituted aryl group, with $X^{15}$ to $X^{18}$ being substituted at α-position of each benzene ring bonded thereto, provided that each benzene ring may have as a substituent a hydrogen atom or a halogen atom except at the α-position for the substitution of $X^{15}$ to $X^{18}$; and $Y^1$ and $Y^2$ are each independently $OSiR^{25}R^{26}R^{27}$, $-OCOR^{25}R^{26}R^{27}$, in which $R^{25}$, $R^{26}$ and $R^{27}$ are each independently an alkyl group having 1 to 10 carbon atoms or an aryl group, and an azo metal chelate compound prepared from an azo compound of formula (V) and a metal:

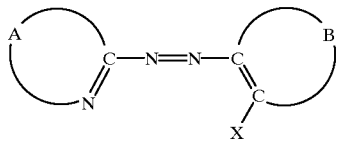

(V)

wherein A is a residue which is capable of forming a heterocyclic ring in combination with the carbon atom and the nitrogen atom to which A is bonded; B is a residue which is capable of forming an aromatic ring or a heterocyclic ring in combination with the two carbon atoms to which B is bonded; and X is a group having an active hydrogen atom.

18. The optical recording medium as claimed in claim 17, wherein said metal for the preparation of said azo metal chelate compound is selected from the group consisting of Ni, Pt, Pd, Co, Cu and Zn.

19. The optical recording medium as claimed in claim 17, wherein the mixing ratio by weight of said compound of formula (I) to one of said organic dyes of formulas (II) to (V) is in a range of 40:100 to 20:100.

20. The optical recording medium as claimed in claim 1, wherein said compound of formula (I) is a mixture of four isomers thereof of formulas (A), (B), (C) and (D):

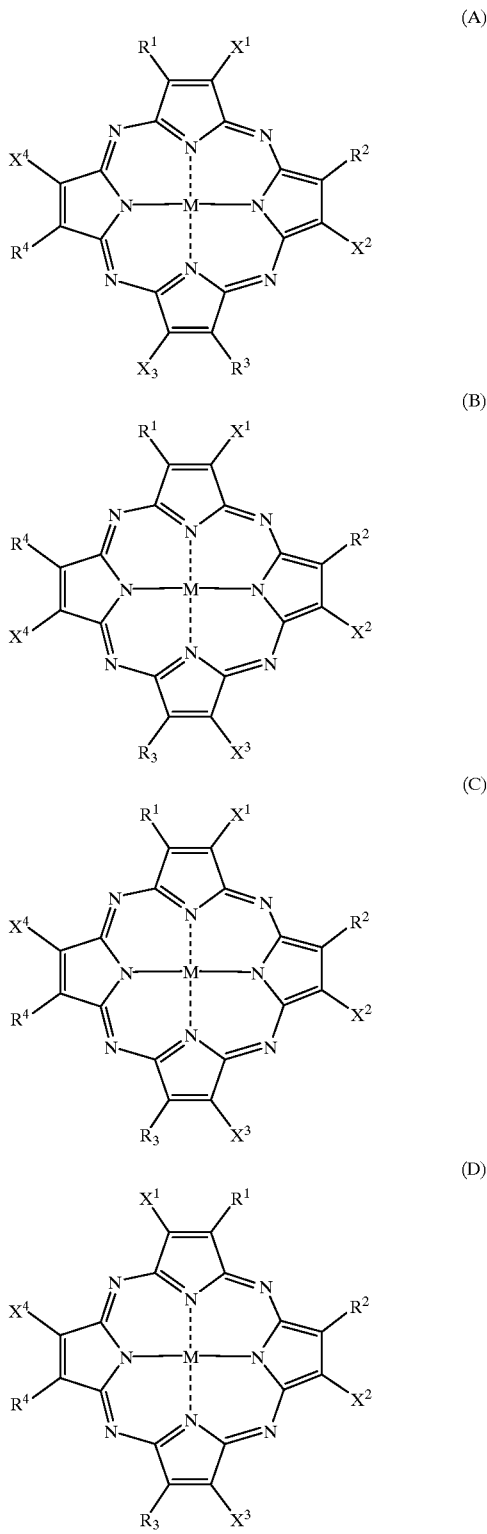

21. A method of recording information, which comprises the step of applying a laser beam in a wavelength range of 630 to 720 nm to an optical recording medium which comprises a substrate, a recording layer formed thereon and a reflection layer which is overlaid on said recording layer, wherein said recording layer comprising at least one compound represented by formula (I),

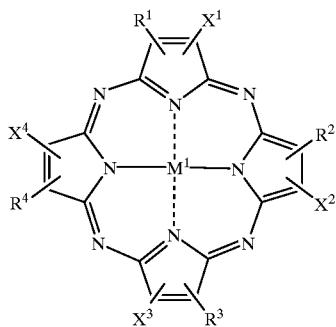
(I)

wherein M represents two independent hydrogen atoms, a bivalent, trivalent and tetravalent metal to which there may be bonded at least one oxygen atom or at least one halogen atom, or a bivalent, trivalent or tetravalent metal to which there may be bonded an unsubstituted or substituted alkyl group, an aryl group, an alkoxyl group, an aryloxy group —$(OPR^{11}R^{12})_t$ group, —$(OPOR^{13}R^{14})_t$ group, —$(OSiR^{15}R^{16}R^{17})_t$ group, —$(OCOR^{18})_t$ group, —$(OR^{19})_t$ group, —$(OCOCOOR^{20})_t$ group, —$(OCOCOR^{21})_t$ group, or —$(OCONR^{22}R^{23})_t$ group, in which $R^{11}$ to $R^{23}$ are each independently a hydrogen atom, a monovalent aliphatic hydrocarbon group which may have a substituent, or a monovalent aromatic hydrocarbon group which may have a substituent, and t is an integer of 0 to 2;

$R^1$ to $R^4$ are each independently a hydrogen atom or an allyl group which may have a substituent; and $X^1$ to $X^4$ are each independently a phenyl group substituted by alkyl, alkoxy, fluorine or a fluorine-atom containing group.

* * * * *

UNITED STATES PATENT AND TRADEMARK OFFICE
CERTIFICATE OF CORRECTION

PATENT NO.    : 6,225,022 B1
DATED         : May 1, 2001
INVENTOR(S)   : Tatsuya Tomura et al.

It is certified that error appears in the above-identified patent and that said Letters Patent is hereby corrected as shown below:

Column 1,
Line 36, "Applications 57-62093," should read -- Applications 57-82093 --.

Column 3,
Line 7, "aryloxy groups" should read -- aryloxy group --.

Column 4,
Line 51, "another examples" should read -- other examples --.

Column 8,
Line 2, "1-ethyl-2-mothylpropyl group," should read -- 1-ethyl-2-methylpropyl group, --;
Line 48, "hexyl groups," should read -- hexyl group, --.

Column 22,
Table 1, column $X_4$, " 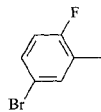 "

should read --  --.

Column 28,
Line 63, "formulas (I) to (V)" should read -- formulas (II) to (V) --.

Column 32,
Line 18, "lease beam" should read -- laser beam --.

Column 34,
Line 23, "present intention" should read -- present invention --;
Line 31, "No. 14 No. 17," should read -- No. 14, No. 17, --.

UNITED STATES PATENT AND TRADEMARK OFFICE
CERTIFICATE OF CORRECTION

PATENT NO. : 6,225,022 B1
DATED : May 1, 2001
INVENTOR(S) : Tatsuya Tomura et al.

It is certified that error appears in the above-identified patent and that said Letters Patent is hereby corrected as shown below:

<u>Column 36,</u>
Table 3, column heading, "Com-
pound
No."

should read -- Com-
pound
No. --;
Line 47, "spinner coatings" should read -- spinner coating --.

<u>Column 38,</u>
Line 5, "No. 41]" should read -- No. 4] --.

<u>Column 39,</u>
Table 4, column heading, "Com-
pound
No."
should read -- Com-
pound
No. --;
Line 27, "operation in a" should read -- operations in a --;

<u>Column 40,</u>
Line 63, "Ann optical" should read -- An optical --.

UNITED STATES PATENT AND TRADEMARK OFFICE
CERTIFICATE OF CORRECTION

PATENT NO. : 6,225,022 B1
DATED : May 1, 2001
INVENTOR(S) : Tatsuya Tomura et al.

It is certified that error appears in the above-identified patent and that said Letters Patent is hereby corrected as shown below:

<u>Column 41,</u>
Line 18, "trivalent and" should read -- trivalent or --.

<u>Column 46,</u>
Line 4, "aryloxy group" should read -- aryloxy group, --;
Line 16, "allyl group" should read -- alkyl group --.

Signed and Sealed this

Eighteenth Day of June, 2002

*Attest:*

JAMES E. ROGAN
*Director of the United States Patent and Trademark Office*

*Attesting Officer*